(12) United States Patent
Ozaki et al.

(10) Patent No.: US 7,028,983 B2
(45) Date of Patent: Apr. 18, 2006

(54) COUPLING MEMBER OF A PIPE COUPLING AND VALVE BODY USED IN A COUPLING MEMBER

(75) Inventors: Yoshikazu Ozaki, Tokyo (JP); Kazutami Ishiwata, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 6 days.

(21) Appl. No.: 10/988,471

(22) Filed: Nov. 12, 2004

(65) Prior Publication Data

US 2005/0098753 A1    May 12, 2005

(30) Foreign Application Priority Data

Nov. 11, 2003   (JP)  .............................. 2003-381107

(51) Int. Cl.
*F16K 51/00*   (2006.01)
*F16L 29/00*   (2006.01)
*F16L 37/28*   (2006.01)

(52) U.S. Cl. ..................... 251/149.6; 251/148; 251/122

(58) Field of Classification Search ............... 251/82, 251/83, 122, 148, 149.1, 149.3, 149.6, 149.7, 251/321, 323; 137/515
See application file for complete search history.

(56) References Cited

U.S. PATENT DOCUMENTS

| 1,919,232 A * | 7/1933 | Lee ............................ 251/122 |
| 1,968,779 A * | 7/1934 | Johnsen ....................... 251/87 |
| 5,027,845 A * | 7/1991 | Silagy ......................... 137/74 |

FOREIGN PATENT DOCUMENTS

| JP | S50-031964 A | 9/1975 |
| JP | S62-031748 A | 8/1987 |

* cited by examiner

*Primary Examiner*—Edward K. Look
*Assistant Examiner*—John K. Fristoe, Jr.
(74) *Attorney, Agent, or Firm*—Brinks Hofer Gilson & Lione

(57) ABSTRACT

When a valve body of a coupling member is moving toward a fluid passage closed position, if the valve body becomes inclined, the present invention prevents a sealing ring of the valve body from coming into friction engagement with a conical wall surface of the fluid passage and coming to a stop. The valve body has a valve head provided with a disk-shaped portion, a sealing ring, and a sealing ring support that supports this sealing ring against the valve head; and an angle that a line tangent to a disk-shaped member of the valve head and sealing ring makes with respect to the axis of the valve body is less than or equal to an angle that the conical wall surface, forming the valve seat of the fluid passage, makes with respect to the axis of this fluid passage.

2 Claims, 6 Drawing Sheets

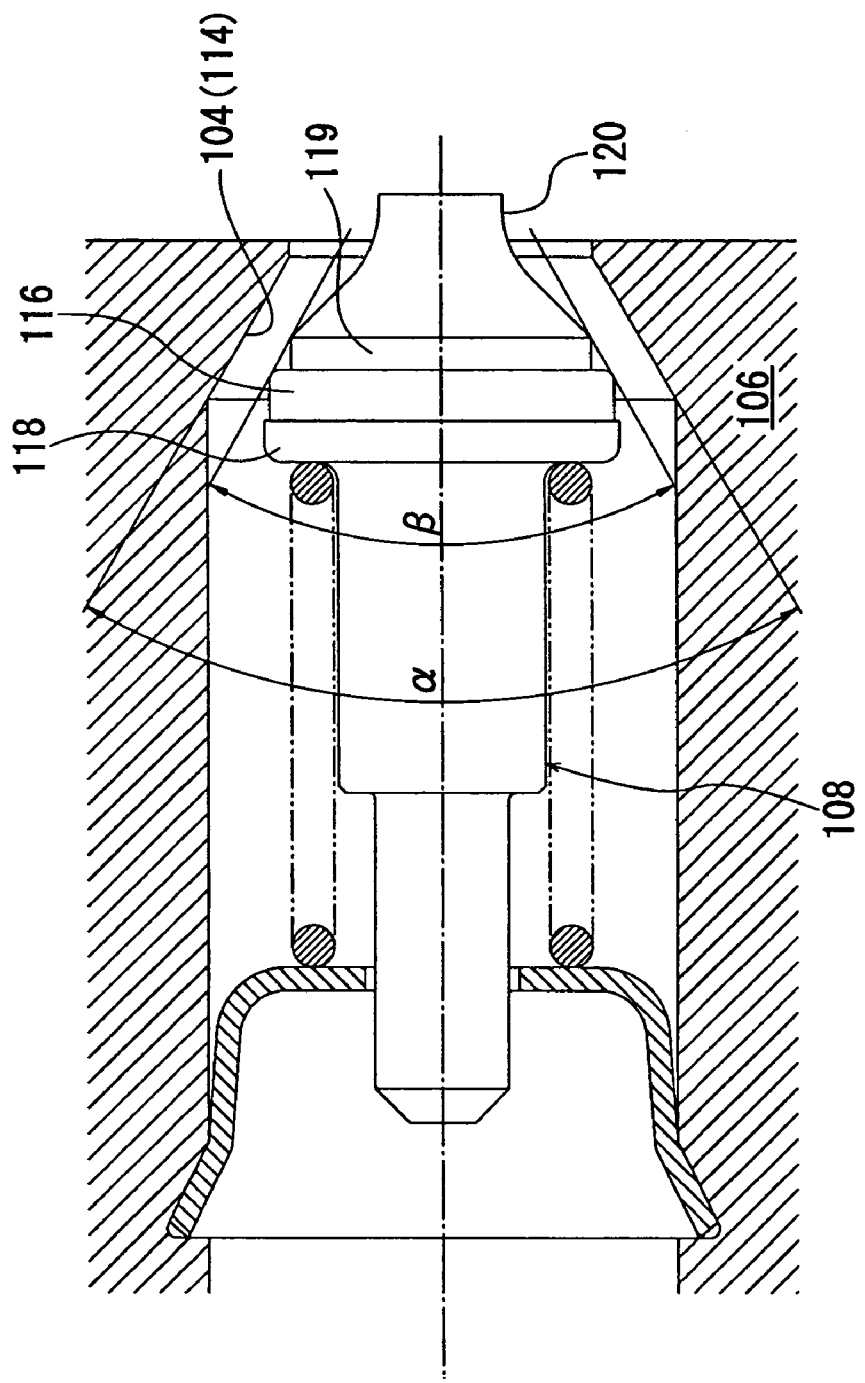

COUPLING MEMBER OF A PIPE COUPLING AND VALVE BODY USED IN A COUPLING MEMBER

This application claims priority under 35 U.S.C. §119 to Japanese Patent Application No. 2003-381107 filed Nov. 11, 2003, the entire content of which is hereby incorporated by reference.

BACKGROUND OF THE INVENTION

The present invention relates to a pipe coupling and particularly to a valve used in a pipe coupling.

FIG. 1 shows one example of a male coupling member provided with a conventional valve 10.

The valve 10 consists of a valve body 12 and a valve seat 20 formed on the wall surface toward the inside of the end opening 18 of the fluid passage 16 of the coupling member 14.

The valve seat 20 is formed from a conical wall surface 21 wherein the wall surface of the fluid passage 16, which is cylindrical overall, is conical with its apex pointed toward the end opening 18. The valve body 12 consists of a shaft 22, a disk-shaped sealing ring support 24 formed at the tip of the shaft 22, a sealing ring 26 supported by the support 24, and a valve head 28 that sandwiches the sealing ring 26 against the sealing ring support 24. The valve head 28 consists of a conical part 30 adjacent to the sealing ring 26, and a protruding part 32 that extends forward from the front-end surface of the conical part 30.

When the valve body 12 is in the closed position shown in FIG. 1 so as to close the fluid passage 16, the valve body 12 is pressed against the valve seat 20 by means of a coil spring 36 mounted between the valve body 12 and a spring support 34 secured to the inner wall surface of the fluid passage 16. The conical part 30 of the valve head 28 comes into contact with a conical wall surface 21 formed by the valve seat 20; and the sealing ring 26 is pressed against the conical wall surface of the valve seat 20.

In a state in which male and female coupling members making up the pipe coupling are connected to each other, the valve body 12 is retracted against the coil spring and separated from the valve seat 20 so that the fluid passage 16 is opened.

When the male and female coupling members are disconnected, the valve body 12 is displaced by the coil spring 36 toward the closed position. However a problem exists with this configuration in that an urging force applied by the coil spring 36 to the valve body 12 may not be uniform. And moreover, effects due to the fluid flowing around the periphery, so as shown in FIG. 2, the valve body 12 may approach the valve seat 20 in a state slightly inclined with respect to the centerline of the fluid passage 16.

In this case, the side surface of the valve head 28 may come into contact with the conical wall surface 21 before the conical part 30 of the valve head 28 makes proper contact with the conical wall surface 21. However, the conical part 30 of the valve head 28 and the sealing ring 26 have the positional relationship illustrated in FIG. 3. Namely, within the plane containing the centerline of the fluid passage 16, the angle β that the line tangent to the conical part 30 and the sealing ring 26 makes with respect to the centerline is greater than the angle α that the conical wall surface 21 of the valve seat 20 makes with respect to the centerline. Thus, in the situation described above in the event that the valve body 12 is slightly inclined when approaching the valve seat 20, the sealing ring 26 will come into contact with the conical wall surface 21 of the valve seat 20, and friction generated between the sealing ring 26 and the conical wall surface 21 of the valve seat 20 will prevent the valve body 12 from advancing completely to the fluid passage closed position. Accordingly, a risk exists of incomplete closure of the fluid passage 16.

In order to solve the problem stated above, a pipe coupling has been developed wherein a cylindrical step is provided in an intermediate portion of the conical wall surface of the valve head, and the end opening of the fluid passage has a predetermined length in the axial direction, so that the cylindrical step enters the end opening before the sealing ring engages the conical wall surface, thus correcting any inclination in the valve body so that the valve body properly reaches the fluid passage closed position (e.g., the publication of examined Japanese utility model application number JP-Y-S50-31964).

In contrast, a pipe coupling has also been developed wherein, assuming that an inclination of the valve body cannot be adequately corrected with only engagement between a cylindrical step of a valve head and an end opening, a plate-shaped guide protruding forward is provided at the center of the tip of the valve head, so that the guide continuously slides within the end opening to correct any inclination of the valve body (e.g., JP-Y-S62-31748).

SUMMARY OF THE INVENTION

The present invention has been made in consideration of the aforementioned points and has as its object to provide a coupling member and valve body used in the coupling member, where the valve has a simple structure wherein, even if inclination arises when the valve body is advancing toward the fluid passage closed position, the valve body will ultimately reach the fluid passage closed position and also a sealing ring is able to reliably attain a tight sealing engagement with the valve seat.

The coupling member according to the present invention provides a coupling member and valve body used in the coupling member that has the same fundamental structure as in the conventional pipe coupling described above, but the valve body comprises: an axis that is collinear with the axis of the fluid channel, a sealing ring that has an outside surface that takes the form of a circle around the axis and, the outside surface being pressed against the conical wall surface which takes the form of the valve seat in the fluid passage closed position, thereby sealing and closing the fluid passage, a sealing ring support that supports the sealing ring, and upon receiving the urging force of the urging member, presses the sealing ring against the conical wall surface 114, a valve head that has a disk-shaped portion, where the disk-shaped portion is in contact with the sealing ring and holds the sealing ring between it and the sealing ring support, and that enters within the end opening 112 of the fluid passage in the fluid passage closed position; and wherein: the angle that the line tangent to the disk-shaped portion and sealing ring makes with respect to the axis of the valve body is less than or equal to the angle that the conical wall surface of the valve seat makes with respect to the axis of the fluid passage.

With the coupling member and valve body according to the present invention, even if inclination arises in the valve body when the valve body is moving toward the fluid passage closed position, the disk-shaped portion of the valve head will make contact before the sealing ring comes into contact with the conical wall surface, so the disk-shaped portion is guided along the conical wall surface and can move up to the end opening of the fluid passage, so the valve body can properly reach the fluid passage closed position. In addition, the valve head will not come into contact with the conical wall surface at the fluid passage closed position, so the sealing ring will reliably engage the conical wall surface and tightly seal and close the fluid passage.

The above and other objects, features and advantages of the present invention will become more apparent from the following description of the preferred embodiments thereof, taken in conjunction with the accompanying drawings.

BRIEF EXPLANATION OF THE DRAWINGS

FIG. 6 is a longitudinal cross section illustrating, in the coupling member of FIG. 4, the relationship between the angle β of the line tangent to the sealing ring and valve head of the valve body and the angle α of the conical wall surface forming the valve seat.

DESCRIPTION OF A PREFERRED EMBODIMENT OF THE INVENTION

There now follows a description of an embodiment of the coupling member of a pipe coupling according to the present invention.

Figure 1:
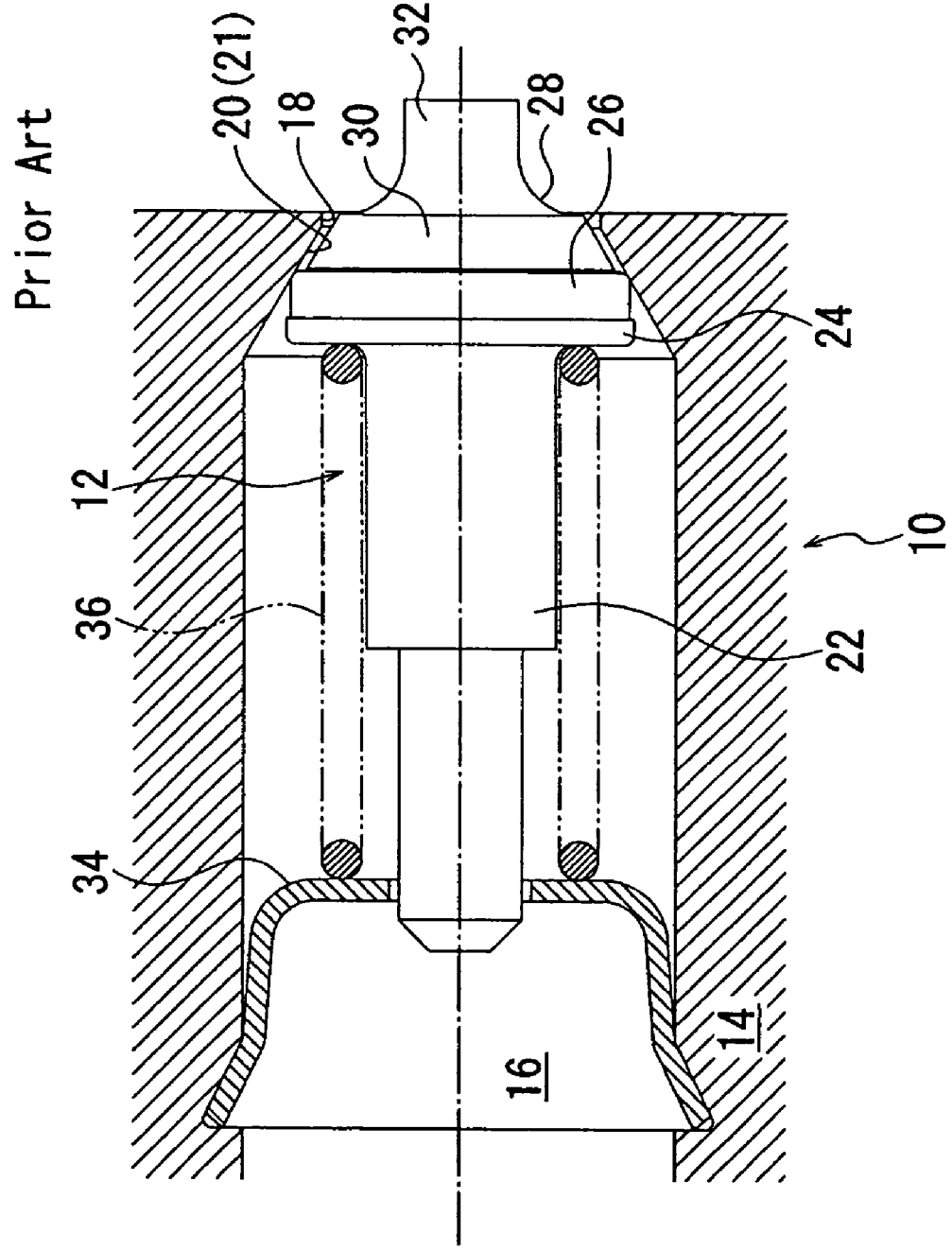
FIG. 1 is a longitudinal cross section of the valve of a conventional coupling member.
Figure 2:
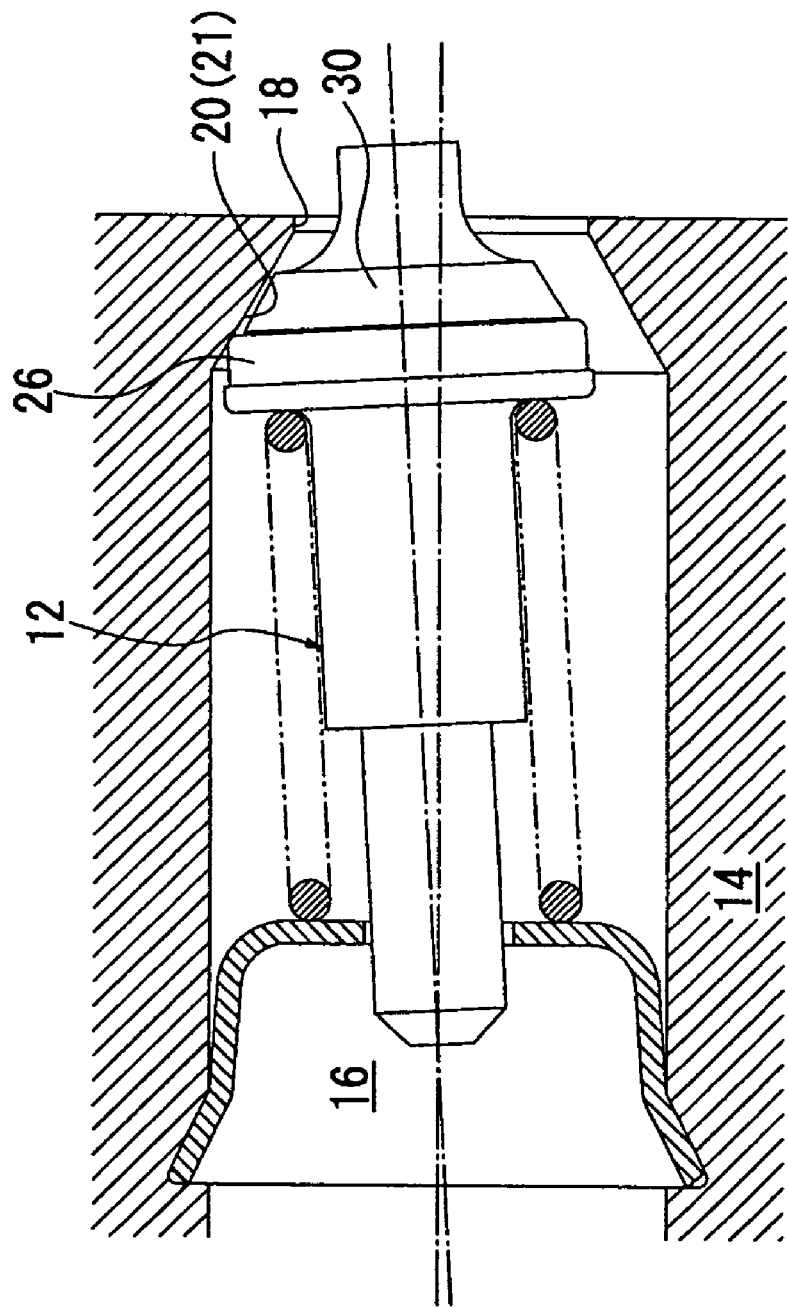
FIG. 2 is a longitudinal cross section illustrating the situation in which the valve body in the valve is inclined while engaging the conical wall surface of the fluid passage constituting the valve seat.
Figure 3:
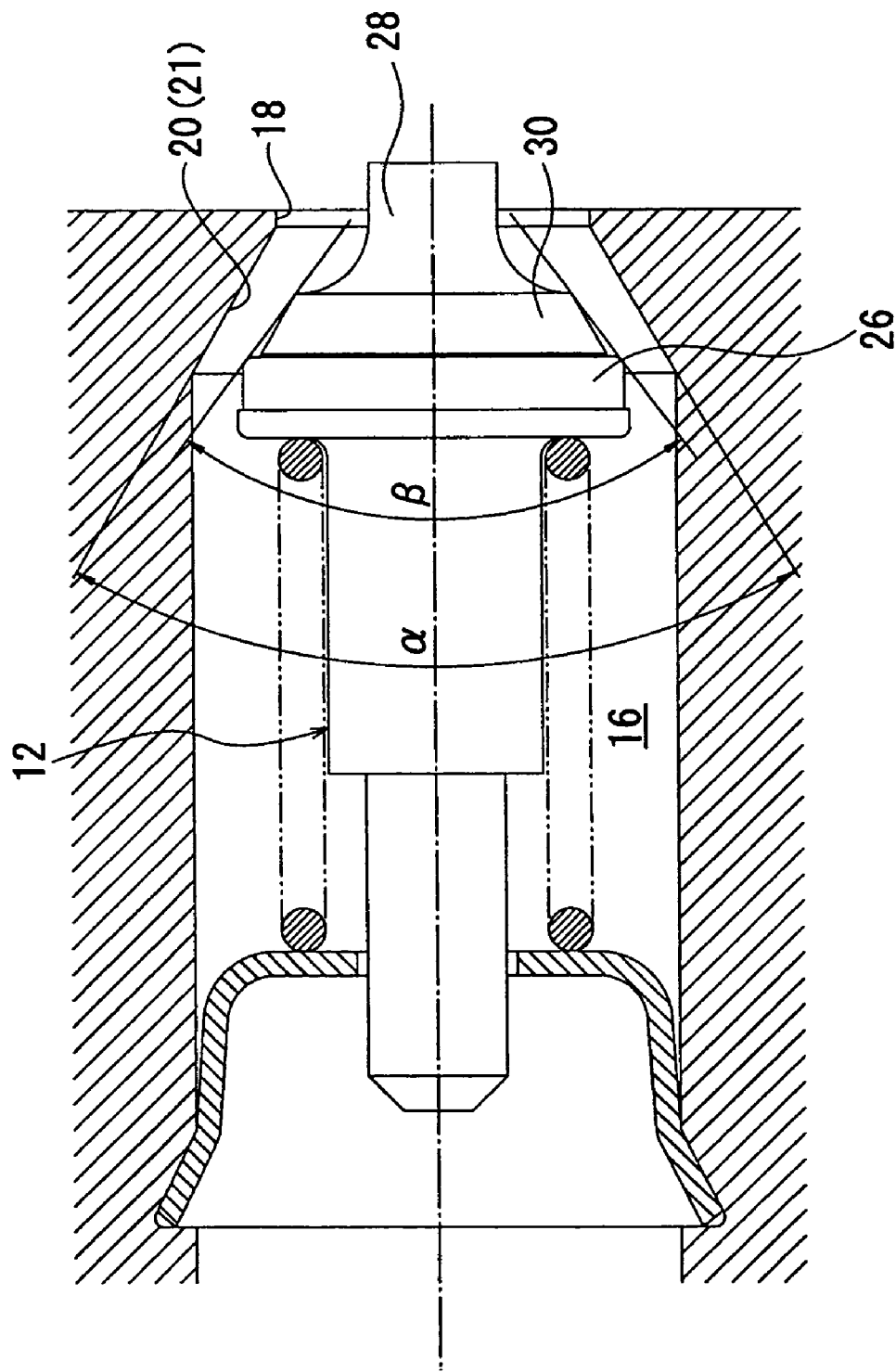
FIG. 3 is a longitudinal cross section illustrating the relationship between the angle β of the line tangent to the sealing ring and valve head of the valve body and the angle α of the conical wall surface forming the valve seat.
Figure 4:
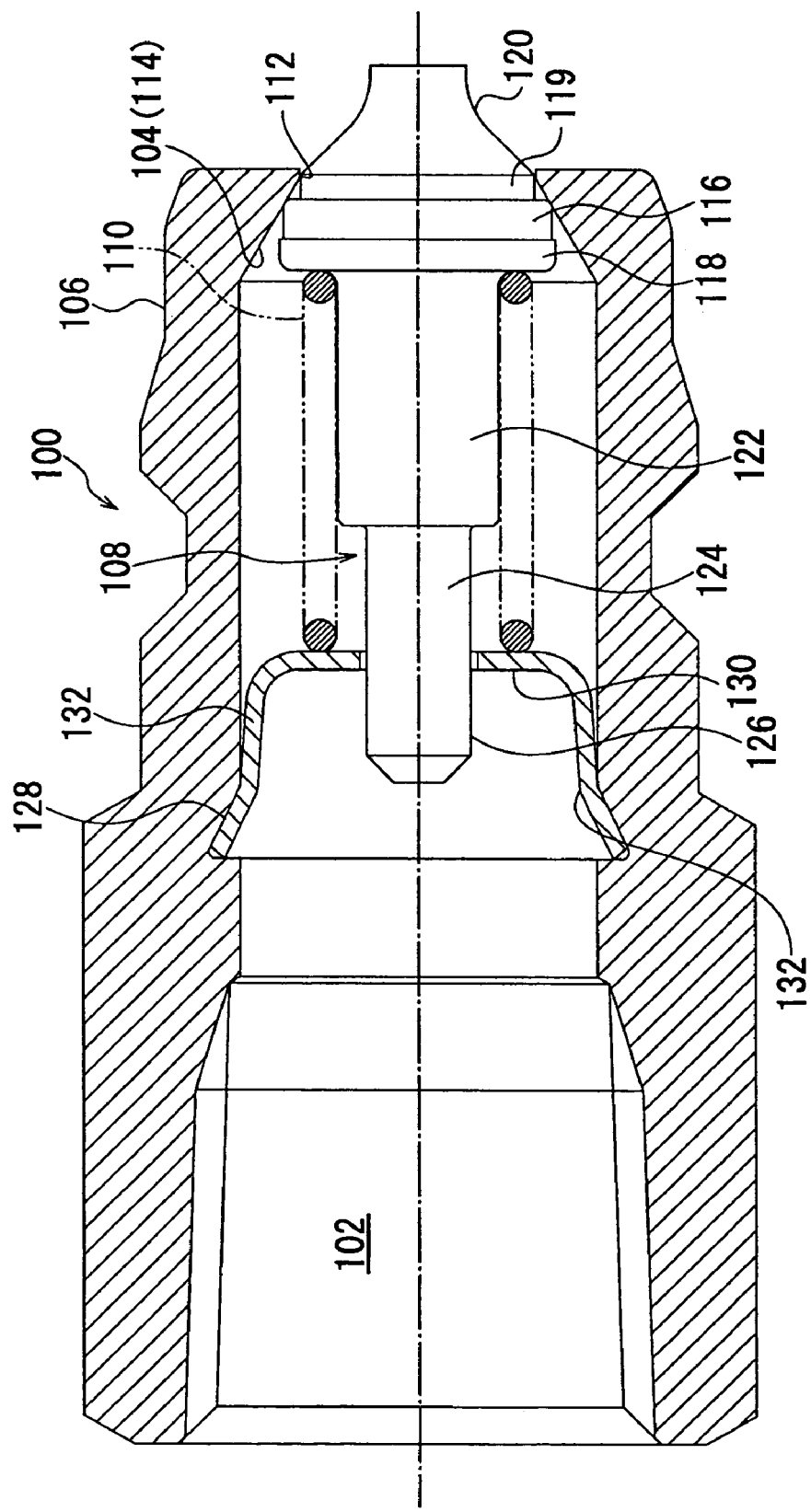
FIG. 4 is a longitudinal cross section of a coupling member provided with a valve according to the present invention.

FIG. 4 shows a male coupling member 100 of a pipe coupling to which the present invention is applied.

The male coupling member 100 has a fluid channel 102, a cylindrical coupling body 106 having a valve seat 104 being formed on the inside wall of the fluid channel 102, a valve body 108 mounted within the fluid channel 102 of the cylindrical coupling body 106 such that it can be displaced along the centerline of the fluid channel 102 between a fluid passage closed position and a fluid passage open position, and a coil spring 110 which is an urging member that urges the valve body 108 toward the fluid passage closed position.

The valve seat 104 is formed on the inside portion of the end opening 112 of the fluid channel 102 about the centerline of the fluid channel 102, from a conical wall surface 114 with its apex pointed toward the end opening 112.

The valve body 108 is provided with a sealing ring 116, a sealing ring support 118 that supports the sealing ring 116 and that, upon receiving the urging force of the coil spring, pushes the sealing ring 116 toward the valve seat 104, and a valve head 120 that has a disk-shaped portion 119 that holds the sealing ring 116 against the sealing ring support 118. The sealing ring support 118 is also disk-shaped, with a shaft 126 consisting of a large-diameter portion 122 and a small-diameter portion 124 that extends backward from the center of its back surface along the centerline of the fluid channel 102. The coil spring 110 is mounted around the shaft 126. A valve support body 128 is provided on the wall surface of the fluid channel 102 and the valve support body 128 consists of a central annular portion 130 through which passes the small-diameter portion 124 of the shaft 126 and a plurality of legs 132 that extend radially from the central annular portion 130. The coil spring 110 is mounted between the central annular portion 130 of the valve support body 128 and the sealing ring support 118.

With a coupling member having the constitution described above, as shown in FIG. 6, the present invention is characterized in that, within the plane containing the centerline of the fluid passage, the angle β that the line tangent to the disk-shaped portion 119 of the valve head 120 and the sealing ring 116 makes with respect to the centerline is less than or equal to the angle α that the conical wall surface of the valve seat 104 makes with respect to the centerline within the same plane.

Figure 5:
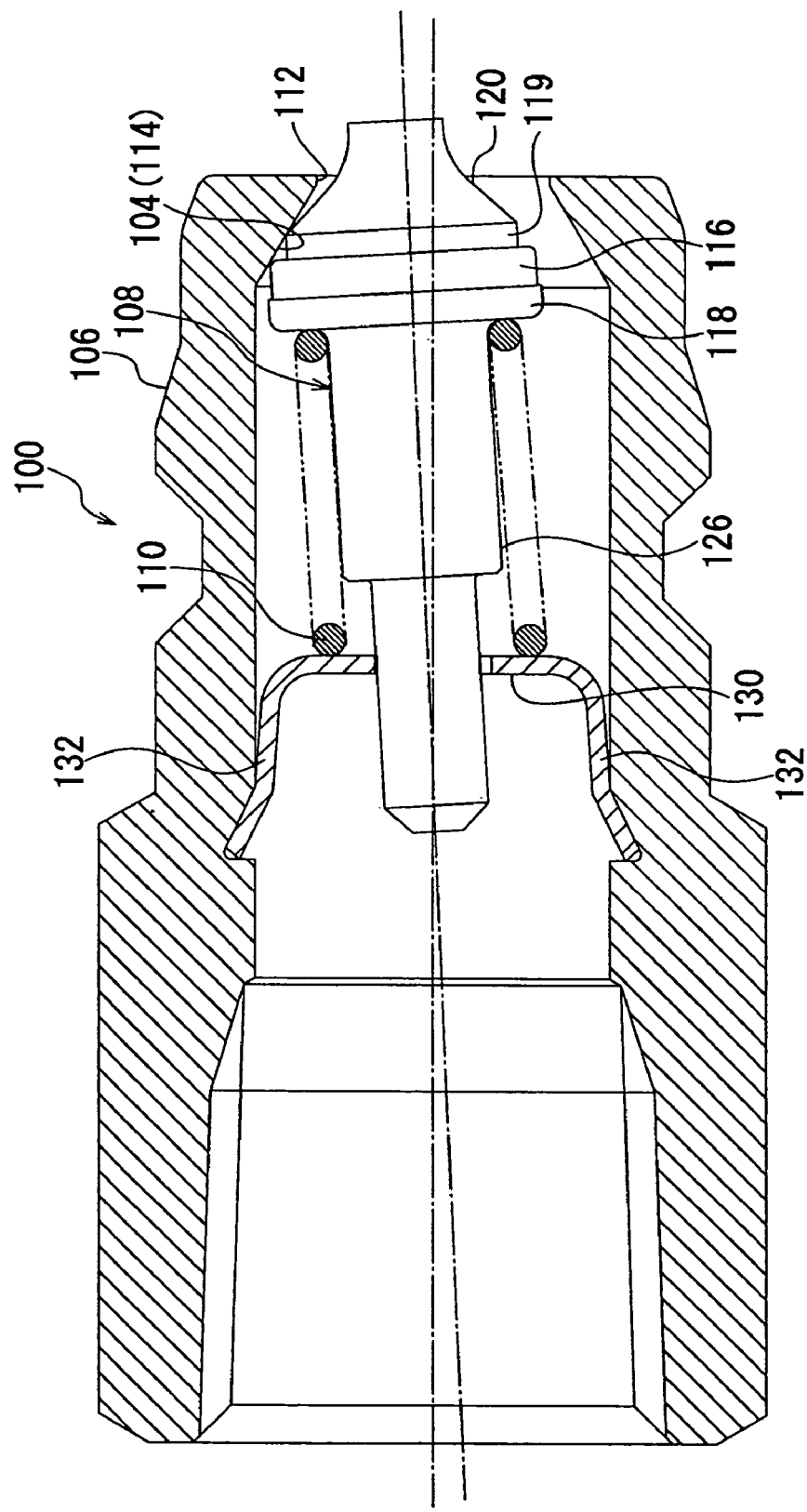
FIG. 5 is a longitudinal cross section illustrating the situation, with the coupling member of FIG. 4, in which the valve body in the valve is inclined while engaging the conical wall surface of the fluid passage constituting the valve seat.

With the coupling member according to the present invention thus constituted, even in a case in which the valve body 108 is slightly inclined so that the valve body 108 comes in contact with the conical wall surface 114 which is the valve seat 104 (FIG. 5) before reaching the fluid passage closed position (FIG. 4), if the angle of inclination is within a predetermined range, then the disk-shaped portion 119 of the valve head comes in contact with the conical wall surface 114 before the sealing ring 116 comes in contact with the conical wall surface 114. The disk-shaped portion 119 is made of brass or other metal and the conical wall surface 114 of the cylindrical coupling body 106 is similarly made of brass or other metal, so the friction between the two is less than in a case in which the sealing ring 116 makes contact, and accordingly the valve body 108 does not stop at the point of contact, but rather advances smoothly along the conical wall surface 114 due to the urging force of the coil spring 110, ultimately reaching the fluid passage closed position (FIG. 4).

Furthermore, the disk-shaped portion 119 of the valve head 120 comes into direct contact with the sealing ring without any intervening conical portions as in the conventional designs, and with the valve body at the fluid passage closed position, the diameter is such that it enters the end opening of the fluid passage, so at the fluid passage closed position, the sealing ring can reliably engage the conical wall surface 114 and tightly seal and close the fluid passage.

Although the present invention has been described in terms of specific embodiments, it is anticipated that alternations and modifications thereof will no doubt become apparent to those skilled in the art. It is therefore intended that the following claims be interpreted as covering all such alternations and modifications as fall within the true sprit and scope of the invention.

What is claimed is:

1. A coupling member of a pipe coupling comprising:
    a cylindrical coupling body, wherein said cylindrical coupling body has a fluid channel and a valve seat formed upon the inside wall of said fluid channel, said fluid channel has an axis, the cross section about said axis is circular, an end opening that is open to the surface of the cylindrical coupling body is provided, and said valve seat is formed from a conical wall surface with its apex pointed toward said end opening;
    a valve body that is mounted within said fluid channel and that can be displaced along said axis of said fluid channel between a fluid passage closed position and a fluid passage open position, and an urging member that urges said valve body toward said fluid passage closed position, wherein:

said valve body comprises:

an axis that is collinear with said axis of said fluid channel, a sealing ring that has an outside surface that takes the form of a circle around said axis and, said outside surface being pressed against said conical wall surface which takes the form of said valve seat in said fluid passage closed position, thereby sealing and closing said fluid passage, a sealing ring support that supports said sealing ring, and upon receiving the urging force of said urging member, presses said sealing ring against said conical wall surface, a valve head that has a disk-shaped portion, where said disk-shaped portion is in contact with said sealing ring and holds said sealing ring between said disk-shaped portion and said sealing ring support, and that enters within said end opening of said fluid passage in said fluid passage closed position;

and wherein:

the angle that the line tangent to said disk-shaped portion and said sealing ring makes with respect to said axis of said valve body is less than or equal to the angle that said conical wall surface of said valve seat makes with respect to said axis of said fluid passage.

2. A valve body used in a coupling member of a pipe coupling comprising:

a cylindrical coupling body, wherein said cylindrical coupling body has a fluid channel and a valve seat formed upon the inside wall of said fluid channel, said fluid channel has an axis, the cross section about said axis is circular, an end opening that is open to the surface of the cylindrical coupling body is provided, and said valve seat is formed from a conical wall surface with its apex pointed toward said end opening;

said valve body that is mounted within said fluid channel and that can be displaced along said axis of said fluid channel between a fluid passage closed position and a fluid passage open position, and an urging member that urges said valve body toward said fluid passage closed position, wherein:

said valve body comprises:

an axis that is collinear with said axis of said fluid channel, a sealing ring that has an outside surface that takes the form of a circle around said axis and, said outside surface being pressed against said conical wall surface which takes the form of said valve seat in said fluid passage closed position, thereby sealing and closing said fluid passage, a sealing ring support that supports said sealing ring, and upon receiving the urging force of said urging member, presses said sealing ring against said conical wall surface, a valve head that has a disk-shaped portion, where said disk-shaped portion is in contact with said sealing ring and holds said sealing ring between said disk-shaped portion and said sealing ring support, and that enters within said end opening of said fluid passage in said fluid passage closed position;

and wherein:

the angle that the line tangent to the disk-shaped portion and said sealing ring makes with respect to said axis of said valve body is less than or equal to the angle that said conical wall surface of said valve seat makes with respect to said axis of said fluid passage.

\* \* \* \* \*